United States Patent
Carr et al.

(10) Patent No.: US 10,003,722 B2
(45) Date of Patent: Jun. 19, 2018

(54) METHOD AND SYSTEM FOR MIMICKING HUMAN CAMERA OPERATION

(71) Applicant: Disney Enterprises, Inc., Burbank, CA (US)

(72) Inventors: George Peter Carr, Pittsburgh, PA (US); Jianhui Chen, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 407 days.

(21) Appl. No.: 14/660,629

(22) Filed: Mar. 17, 2015

(65) Prior Publication Data

US 2016/0277673 A1    Sep. 22, 2016

(51) Int. Cl.
| | |
|---|---|
| H04N 7/18 | (2006.01) |
| H04N 5/222 | (2006.01) |
| H04N 17/00 | (2006.01) |
| H04N 5/247 | (2006.01) |

(52) U.S. Cl.
CPC ......... H04N 5/2228 (2013.01); H04N 17/002 (2013.01); H04N 5/247 (2013.01)

(58) Field of Classification Search
CPC ..... H04N 5/2228; H04N 17/002; H04N 5/247
See application file for complete search history.

(56) References Cited

U.S. PATENT DOCUMENTS

2006/0056056 A1* 3/2006 Ahiska ............. G08B 13/19608
359/690
2008/0117296 A1* 5/2008 Egnal .................... H04N 7/181
348/143
2008/0225651 A1* 9/2008 Waites .................... G11B 27/11
369/4

(Continued)

OTHER PUBLICATIONS

Hu et al ("A Real Time Dual-Camera Surveillance System Based on Tracking-Learning-Detection Algorithm"; School of Aeronautics and Astronautics, Shanghai Jiao Tong University, Shanghai 200240, China; pp. 1-6; Date: 2013; URL: http://ieeexplore.ieee.org/document/6561048/).*

(Continued)

Primary Examiner — Sathyanaraya V Perungavoor
Assistant Examiner — Peet Dhillon
(74) Attorney, Agent, or Firm — Patterson+Sheridan, LLP (57) ABSTRACT

The disclosure provides an approach for mimicking human camera operation with an autonomous camera system. In one embodiment, camera planning is formulated as a supervised regression problem in which an automatic broadcasting application receives one video input captured by a human-operated camera and another video input captured by a stationary camera with a wider field of view. The automatic broadcasting application extracts feature vectors and pan-tilt-zoom states from the stationary camera and the human-operated camera, respectively, and learns a regressor which takes as input such feature vectors and outputs pan-tilt-zoom settings predictive of what the human camera operator would choose. The automatic broadcasting application may then apply the learned regressor on newly captured video to obtain planned pan-tilt-zoom settings and control an autonomous camera to achieve the planned settings to record videos which resemble the work of a human operator in similar situations.

18 Claims, 4 Drawing Sheets

(56) References Cited

U.S. PATENT DOCUMENTS

2013/0259346 A1* 10/2013 El-Baz ................. G06T 7/0012
382/131

OTHER PUBLICATIONS

L. Alvarez, L. Gomez, P. Henriquez, and J. S'anchez. Realtime camera motion tracking in planar view scenarios. Journal of Real-Time Image Processing, pp. 1-13, 2013.
Anonymous. Autonomous camera system: a survey. In anonymous, 2014.
Y. Ariki, S. Kubota, and M. Kumano. Automatic production system of soccer sports video by digital camera work based on situation recognition. In Multimedia, 2006. ISM'06. Eighth IEEE International Symposium on, pp. 851-860. IEEE, 2006.
F. Chen, D. Delannay, and C. De Vleeschouwer. An autonomous framework to produce and distribute personalized team-sport video summaries: A basketball case study. Multimedia, IEEE Transactions on, 13(6):1381-1394, 2011.
A. Gupta, J. J. Little, and R. J. Woodham. Using line and ellipse features for rectification of broadcast hockey video. In Computer and Robot Vision (CRV), 2011 Canadian Conference on, pp. 32-39. IEEE, 2011.
R. Hess and A. Fern. Improved video registration using nondistinctive local image features. In CVPR, 2007, pp. 1-8. IEEE, 2007.
K. Kim, D. Lee, and I. Essa. Detecting regions of interest in dynamic scenes with camera motions. In CVPR, 2012, pp. 1258-1265. IEEE, 2012.
K. Okuma, J. J. Little, and D. G. Lowe. Automatic rectification of long image sequences. In ACCV, p. 9, 2004.
J. Puwein, R. Ziegler, L. Ballan, and M. Pollefeys. Ptz camera network calibration from moving people in sports broadcasts. In Applications of Computer Vision (WACV), 2012 IEEE Workshop on, pp. 25-32. IEEE, 2012.

* cited by examiner

METHOD AND SYSTEM FOR MIMICKING HUMAN CAMERA OPERATION

BACKGROUND

Field

This disclosure provides techniques for automatically capturing video. More specifically, embodiments of this disclosure present techniques for mimicking human camera operators in capturing a video.

Description of the Related Art

Automatic broadcasting, in which autonomous camera systems capture video, can make small events, such as lectures and amateur sporting competitions, available to much larger audiences. Autonomous camera systems generally need the capability to sense the environment, decide where to point a camera (or cameras) when recording, and ensure the cameras remain fixated on intended targets. Traditionally, autonomous camera systems follow an object-tracking paradigm, such as "follow the lecturer," and implement camera planning (i.e., determining where the camera should look) by smoothing the data from the object tracking, which tends to be noisy. Such autonomous camera systems typically include hand-coded equations which determine where to point each camera. One problem with such systems is that, unlike human camera operators, hand-coded autonomous camera systems cannot anticipate action and frame their shots with sufficient "lead room." As a result, the output videos produced by such systems tend to look robotic, particularly for dynamic activities such as sporting events.

SUMMARY

One embodiment of this disclosure provides a computer implemented method for building a model to control a first device. The method generally includes receiving, as input, demonstration data from a human operating a second device to perform a demonstration and environmental sensory data associated with the demonstration data. The method further includes determining device settings of the second device, as operated by the human, from the demonstration data, and extracting, from the sensory data, feature vectors describing at least locations of objects in the environment. In addition, the method includes training, based on the determined device settings and the extracted feature vectors, a regressor which takes additional feature vectors as input and outputs planned device settings for operating the first device, and instructing the first device to attain the planned device settings output by the trained regressor.

Other embodiments include, without limitation, a computer-readable medium that includes instructions that enable a processing unit to implement one or more aspects of the disclosed method as well as a system configured to implement one or more aspects of the disclosed method.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

This disclosure provides techniques for an autonomous camera system to more effectively mimic a human camera operator. In one embodiment, a supervised regression problem is applied to formulate camera planning. More specifically, an automatic broadcasting application receives one video input captured by a human-operated camera and another video input captured by a stationary camera with a wider field of view. The automatic broadcasting application extracts feature vectors and pan-tilt-zoom states from the stationary camera and the human-operated camera, respectively. The automatic broadcasting application uses the feature vector to represent what it sees, and the feature vector may include, e.g., a centroid, a heat map, or a spherical map that describes player locations in the stationary camera video input. Further, the automatic broadcasting application learns, based on the extracted feature vectors and pan-tilt-zoom states, a regressor. This regressor is a function that receives the feature vectors and outputs pan-tilt-zoom settings predicting what a human camera operator would choose. The automatic broadcasting application may then apply the learned regressor to determine target pan-tilt-zoom settings when recording a scene and control an autonomous camera to achieve the target settings. As a result, the autonomous camera may record the scene in a manner that resembles the work of a human operator in similar situations.

Although discussed herein primarily with respect to determining pan-tilt-zoom states from one video input captured by a human operated camera and extracting feature vectors from another video input captured by a stationary camera, techniques disclosed herein may be generalized to any human demonstration input (and not just a video captured by a human) indicating where a camera is pointing, such as pan and tilt values collected by electronic sensors embedded in an "instrumented" camera tripod. Further, techniques disclosed herein may make use of any sensory data (and not just video captured by a stationary camera) from sensing the environment, such as radio frequency identification (RFID) tracking data, scoreboard data for a game, etc. Techniques disclosed herein may also be adapted for use with cameras whose positions are not fixed (e.g., handheld cameras) and devices other than cameras, such as directional microphones and spotlights, whose operation by a human may be taken as demonstration input that, together with environmental sensory data, is used to train a regressor for generating planned device settings predictive of human operation of the handheld camera, directional microphone, spotlight, or other device. In such cases, the device settings may include pan-tilt-zoom and position settings (for the handheld camera), pan and tilt settings (for the microphone and spotlight), or any other appropriate settings associated with the device that may be chosen by a human operator whose operation of the device may then be mimicked by training a regressor. In addition, techniques disclosed herein may be used to mimic human behavior in general when operating a device, such as shakiness when recording video with a handheld camera or other human errors.

Although a basketball game is used as a reference example herein, and panning is the primary pan-tilt-zoom change for typical basketball game videos, techniques disclosed herein are also applicable to other sports and scenes (e.g., meeting a character at a theme park). In general, techniques disclosed herein do not rely on specific domain knowledge, except the regressor that is learned. Further, techniques disclosed herein may be adapted to scenes where tilting or zooming are more important camera behaviors.

Figure 1:
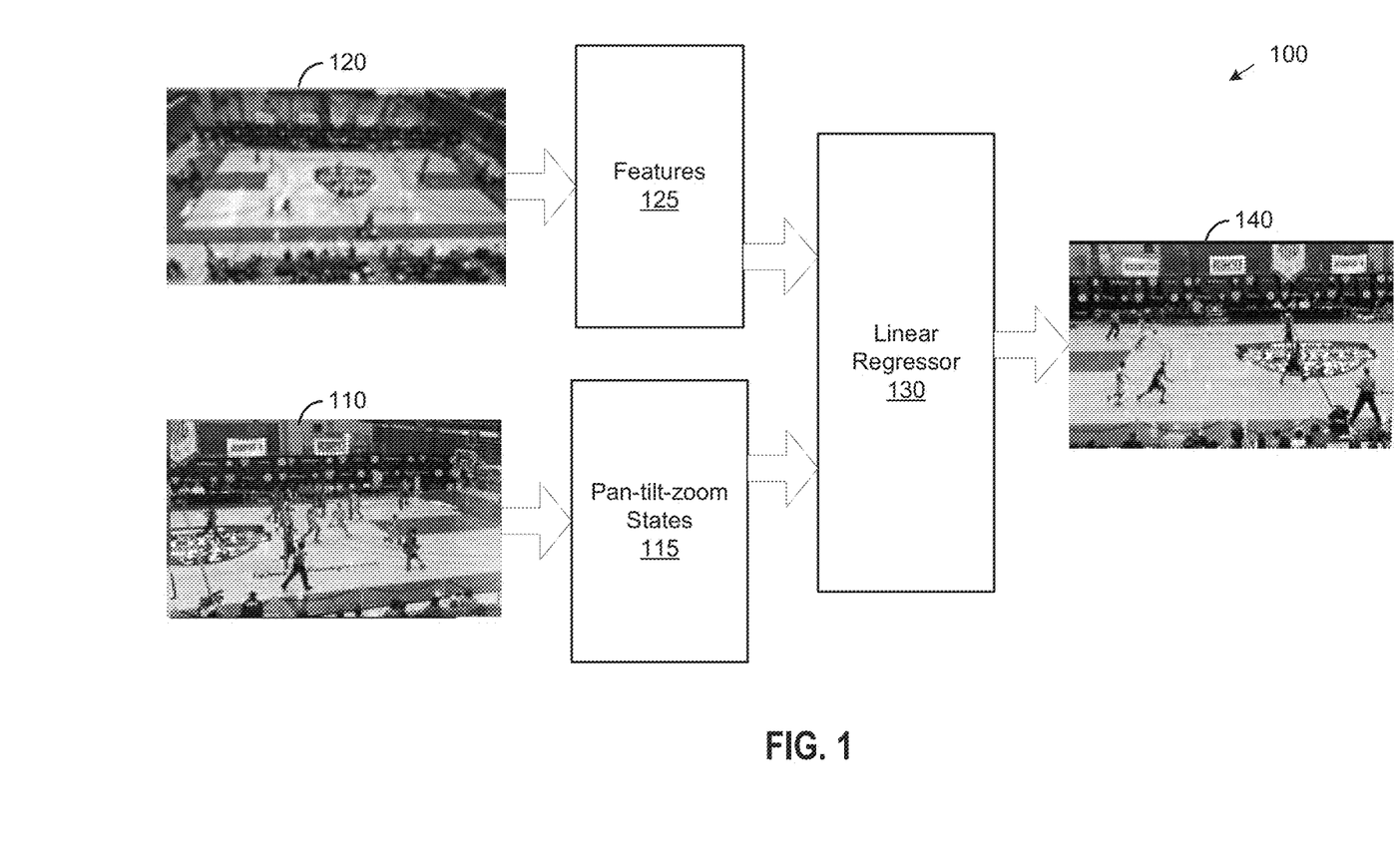
FIG. 1 illustrates an approach for training a system to autonomously capture videos, according to an embodiment.

FIG. 1 illustrates an approach for training a system to autonomously capture video, according to an embodiment. As shown, an automatic broadcasting application receives video inputs 110-120 from two cameras capturing the same event, in this example, a basketball game. A first video input 110 is captured by a human-operated camera. A second video input 120 is captured by a stationary camera with a wider field of view, such as a camera with a higher vantage point of the game or with different lens settings. Given the video inputs 110-120, the automatic broadcasting application extracts feature vectors 125 from the second video input 120 and exemplary camera pan-tilt-zoom states 115 from the first video input 110. As discussed in greater detail below, the feature vectors 125 may include, e.g., a centroid, heat map, or spherical map that describes player locations in the second video input 120. In videos of basketball games, it may be assumed that tilt and zoom are constant, as a wide shot is typically maintained with a mostly constant tilt angle. Accordingly, the automatic broadcasting system may determine pan angles of the first human-operated video input 110 using, e.g., a pinhole model technique or modified pan-tilt-zoom model, discussed below.

In one embodiment, camera planning may be modeled as a structured regression problem $$\hat{y}_t = h(x_t), \tag{1}$$

where $\hat{y}_t$ is the planned pan-tilt-zoom state of the camera for a particular time t, $x_t$ is a feature vector extracted from the current tracking data, and $h(\cdot)$ is a learned regressor (e.g., a linear regression) 130 which takes as input the feature vector $x_t$ and outputs the planned pan-tilt-zoom state $\hat{y}_t$. The exemplary camera pan angles 115 derived from the first video input 110 provide the pan-tilt-zoom states $\{y_t\}$ and the observed tracking features from the second video input 120 provide feature vectors $\{x_t\}$, which together form the paired data $\{(y_t, x_t)\}$ used to train the regression $h(\cdot)$. The automatic broadcasting application may train $h(\cdot)$ using various machine learning algorithms, discussed in greater detail below.

After training the regressor $h(\cdot)$, the automatic broadcasting application uses the trained regressor (again, $h(\cdot)$) to generate planned pan-tilt-zoom settings for an autonomous robotic camera based on feature vectors extracted from later video captured by the stationary camera. Once generated, the automatic broadcasting application may control motors in the autonomous robotic camera to achieve the planned pan-tilt-zoom settings and capture video 140. Alternatively, a stationary camera may be used to capture a wide field of view (e.g., an entire basketball court), and the automatic broadcasting application may sample this captured video to generate a video that appears as if it were captured by a camera with the planned pan-tilt-zoom settings.

Figure 2:
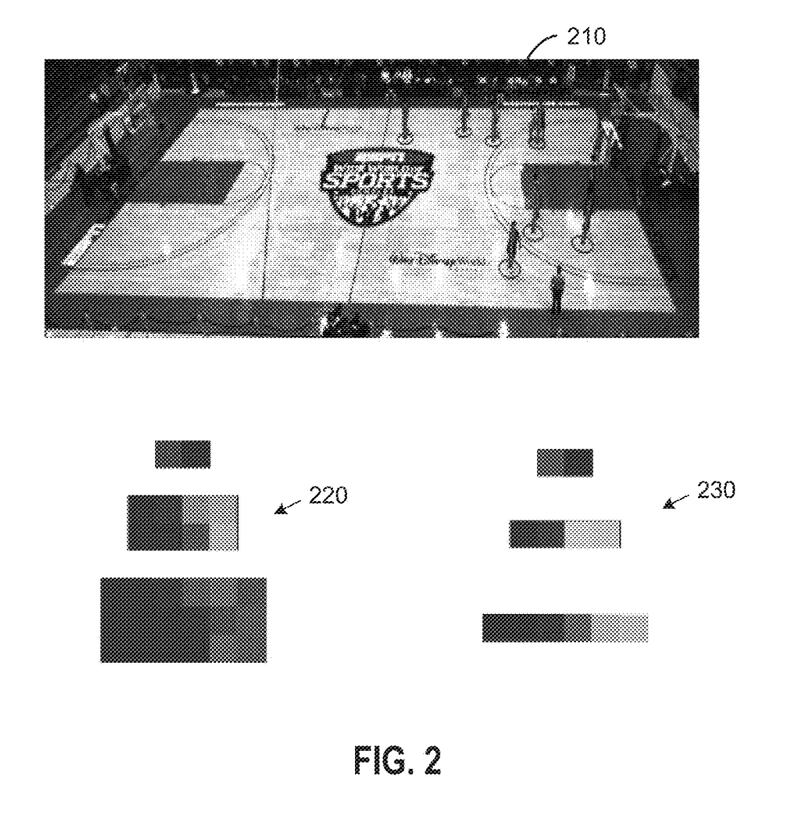
FIG. 2 illustrates example features extracted from input video, according to an embodiment.

FIG. 2 illustrates example features extracted from input video, according to an embodiment. As shown, a frame 210 from a video captured by a stationary camera has a wide field of view depicting an entire basketball court. The automatic broadcasting application detects foreground elements of a scene (in this case the basketball players) within a video frame by, e.g., subtracting a background (the basketball court) and analyzing the results in terms of bounding regions representing each foreground element (e.g., by modeling players as a 3D cylinder). In one embodiment, to minimize the impact of missed and false player detections, the automatic broadcasting application may analyze the frame data in frame chunks, such as $\tau=12$ frame chunks ($\approx 0.5$ s), and greedily fit constant velocity models to the detection data using random sample consensus (RANSAC). In such a case, temporal chunk t would contain a set $T_t = \{T_1, T_2, \ldots T_{Nt}\}$ of short constant velocity trajectories.

In one embodiment, a fixed length feature vector $x_t$ is extracted from each set $T_t$ of player trajectories. The player trajectories may be noisy due to, e.g., detecting the referee or shadows, occlusions, and the like. Three possible feature vectors are a centroid, a heat map 230, and a spherical map 230. These and other feature vectors may be used alone or in conjunction with one another to train a regressor. The centroid may generally be defined as the 2-dimensional feature vector $x_t^{centroid}$ with the average (x, y) location of all players during temporal chunk t. Although discussed herein primarily with respect to player locations, the feature vector may also (or instead) include data from other signals, such as game time, game state data (e.g., scoreboard data), among other things. That is, information about the event being trained for capture by the autonomous camera system may be informed with environmental sensory data such as the game time, game state, etc. In addition, player locations themselves may also be tracked using other techniques, such as RFID, and such RFID signals could be part of the feature representation.

The automatic broadcasting application may generate a heat map, such as the heat map 230, by dividing the basketball court into a 2D grid, counting the number of players within each cell of the grid, and assigning the counts to the appropriate elements of feature vector $x_t^{heat\ map}$. In one embodiment, to minimize quantization effects (i.e., errors from trying to fit players into grid cells), the automatic broadcasting application can linearly interpolate each player's count between the four neighboring cells of the grid (above, below, left, and right). Additionally, by changing the resolution of the grid, the automatic broadcasting application may generate heat maps at different scales. In a particular embodiment, three resolutions may be used: 2×1, 4×2, and 6×3. In such a case, the automatic broadcasting application may stack the heat maps of the three different scales together to form a 28-dimension feature vector.

The automatic broadcasting application may generate a spherical heat map $x_t^{spherical\ map}$, such as the spherical map 230, on the unit sphere of the camera. The spherical map is useful for predicting a pan angle of a pan-tilt-zoom camera in particular, where there is an inherent non-linear spherical projection between a world coordinate system and a pan-tilt-zoom domain of the camera. With the spherical map, player locations may be projected onto the unit sphere, and the automatic broadcasting application may then count the number of players within each cell of the spherical map grid to generate $x_t^{spherical\ map}$. As discussed, only pan axis is quantized in this case, which assumes that tilt and zoom are constant and may be suitable for capturing certain events such as basketball in which a wide shot is maintained with a mostly constant tilt angle. In a particular embodiment, spherical heat maps may be generated for resolutions 1×2, 1×4, and 1×8. Similar to the heat map discussed above, the spherical heat map scales may be stacked to build a 14-dimension feature vector. Unlike the heat map in the world coordinate system, the spherical heat map is specific to a particular camera location C, and the spherical map is effectively a polar quantization of the player positions on the basketball court. That is, the spherical map provides counts of the number of players in angular regions of a unit sphere representing the camera.

Figure 3:
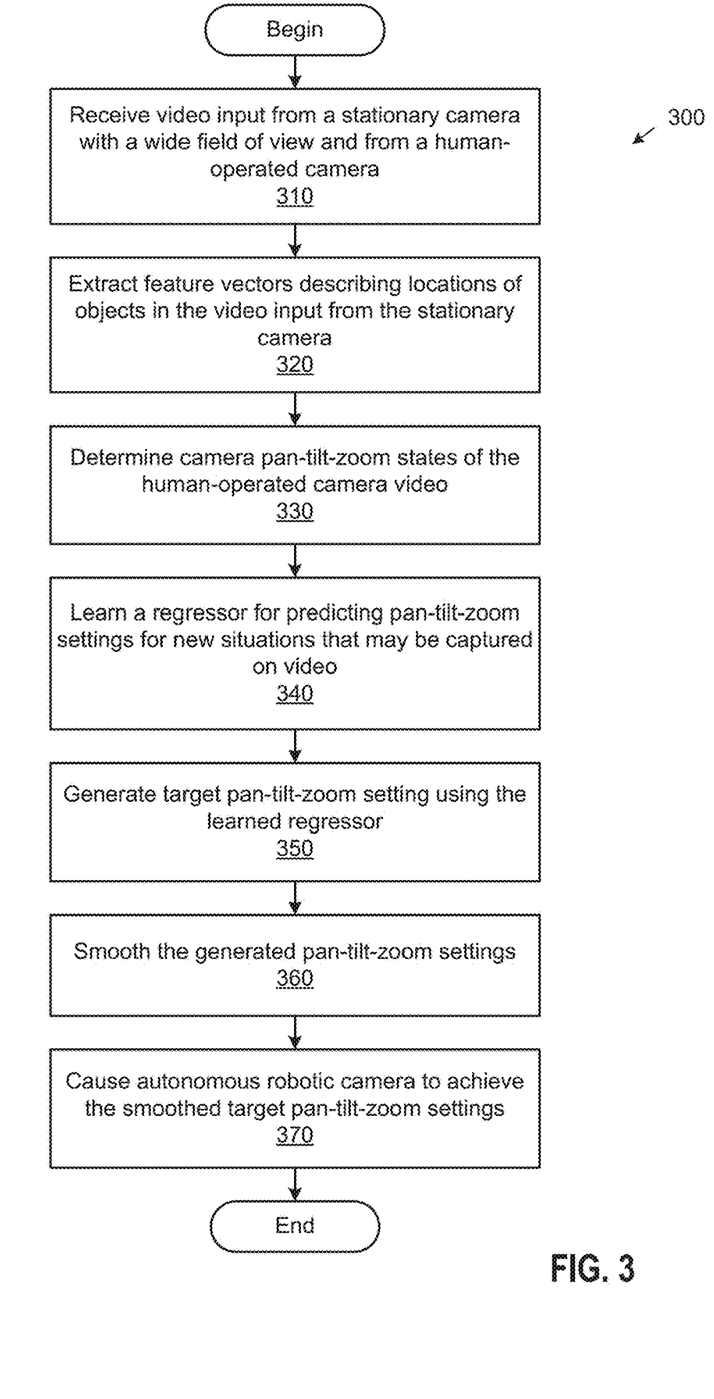
FIG. 3 illustrates a method for capturing videos that mimic human camera operation, according to an embodiment.

FIG. 3 illustrates a method 300 for capturing video that mimics human camera operation, according to an embodiment. As shown, the method 300 begins at step 310, where an automatic broadcasting application receives video input from a stationary camera with a wide field of view and video input from a human-operated camera.

At step 320, the automatic broadcasting application extracts feature vectors describing at least locations of objects (e.g., people) in the video input from the stationary camera. As discussed, the automatic broadcasting application may first detect players and their trajectories within video frames by subtracting a background and analyzing the results in terms of 3D cylinders, such as by analyzing frame chunks and greedily fitting constant velocity models to the detection data using RANSAC. Of course, other foreground object detection and tracking approaches could be used. The automatic broadcasting application then extracts a feature vector $x_t$ from each set of noisy player trajectories. As noted relative to FIG. 2, examples of feature vectors may include a centroid, a heat map, and a spherical map. In an alternative embodiment, the feature vector could include other data, such as game time, game state (e.g., number of points scored), etc. (again, using domain knowledge can inform the modeling of the automatic camera planning, but is not required to mimic human camera operator).

At step 330, the automatic broadcasting application determines camera pan-tilt-zoom states $y_t$ of the human-operated camera video. In one embodiment, the pan-tilt-zoom states $y_t$ may be simplified to just pan angles. As discussed, only considering pan angles may be sufficient for generating a model for an autonomous camera to record some events such as basketball games in which a wide shot zoom is maintained along with a generally constant tilt angle. The pinhole model is frequently used to describe the projective aspects of a camera, and the automatic broadcasting application may determine camera pan angles using the pinhole model in one embodiment.

In another embodiment, the automatic broadcasting application may use a revised pan-tilt-zoom model that improves upon the pinhole model. The standard pinhole model has form $$P = KR[1 | -C], \quad (2)$$

where K is the intrinsic matrix, R is a rotation matrix from the world coordinate system to the camera coordinate system, and C is the camera's center of projection. Assuming square pixels, the intrinsic matrix intrinsic matrix K is defined by the focal length f of the camera and principle point ($u_0$, $v_0$):

$$K = \begin{bmatrix} f & 0 & u_0 \\ 0 & f & v_0 \\ 0 & 0 & 1 \end{bmatrix}. \quad (3)$$

By fixing ($u_0$, $v_0$) to the center of the video frame, the intrinsic matrix only has one degree of freedom. Generally, a pan-tilt-zoom camera has two separate components: a camera and a robotic head. The rotation matrix R changes as the robotic head moves. Thus, the rotation matrix R may be factored into two rotation matrices Q and S:

$$R = QS. \quad (4)$$

The rotation matrix S represents the rotation from the world coordinate system to the pan-tilt motor coordinate system and remains constant regardless of the actual pan-tilt settings. The rotation matrix may be modeled using the Rodrigues notation $S = [s_x, s_y, s_z]^T$. The matrix Q represents the 3D rotation for a specific pan-tilt ($\theta$, $\phi$) setting $$Q = Q_\phi Q_\theta \quad (5)$$

where $$Q_\phi = \begin{bmatrix} 1 & 0 & 0 \\ 0 & \cos\phi & \sin\phi \\ 0 & -\sin\phi & \cos\phi \end{bmatrix} \quad (6)$$

and $$Q_\theta = \begin{bmatrix} \cos\theta & 0 & -\sin\theta \\ 0 & 1 & 0 \\ \sin\theta & 0 & \cos\theta \end{bmatrix}. \quad (7)$$

Most pan-tilt-zoom models assume the rotation center is the same as the projection center. However, this is only an approximation, as some cameras do not obey this assumption. For example, a camera may be mounted on a tripod and rotate around the tripod head. In such a case, the projection center (near the camera's lens) may be far from the rotation center (the tripod head). To account for this displacement, one embodiment may employ a modified pan-tilt-zoom model:

$$P = K\tilde{C} \begin{bmatrix} R & 0 \\ 0 & 1 \end{bmatrix} \begin{bmatrix} I & -D \\ 0 & 1 \end{bmatrix}. \quad (8)$$

Here, D is the center of rotation, and $\tilde{C}$ is the translation from the center of rotation to the center of projection $$\tilde{C} = \begin{bmatrix} 1 & 0 & 0 & \tilde{c}_x \\ 0 & 1 & 0 & \tilde{c}_y \\ 0 & 0 & 1 & \tilde{c}_z \end{bmatrix}. \quad (9)$$

The center of projection changes significantly whenever the camera zooms in or out. As a result, the displacement between the center of rotation and the center of projection may be modeled as a linear function of f:

$$\tilde{c}_x = \lambda_1 + \lambda_4 f$$

$$\tilde{c}_y = \lambda_2 + \lambda_5 f$$

$$\tilde{c}_z = \lambda_3 + \lambda_6 f \quad (10)$$

In the modified pan-tilt-zoom model, there are twelve time invariant parameters $\Phi = [D_x, D_y, D_z, s_x, s_y, s_z, \lambda_1, \ldots, \lambda_6]^T$ and three per-frame parameters $[\theta, \phi, f]^T$. Constrained by the common parameters $\Phi$, the model can estimate pan, tilt, and focal length from at least two correspondences. Here, a correspondence refers to the same thing (e.g., a specific location on the basketball court such as a corner of the court) being identified in two images, as discussed in greater detail below.

To estimate the parameters of the modified pant-tilt-zoom camera model, the automatic broadcasting application may first independently estimate a calibration matrix $P_j$ of each video frame j using the standard pinhole model. Thereafter, the automatic broadcasting application could employ a Levenberg-Marquardt optimization to estimate the time invariant parameters $\Phi$ of the modified pan-tilt-zoom model with the consistent center of rotation and per-frame pan-tilt-zoom settings by minimizing the projection error of key points as follows:

$$\arg\min \Sigma_i \|m_i - \hat{m}_i\|^2. \quad (11)$$

Here, $m_i$ is the observed image location of known 3D point $M_i$ (e.g., corners of basketball court markings), and $\hat{m}_i$ is the projection of $M_i$ by $P(\Phi, \theta_j, \phi_j, f_j)$. That is, the automatic broadcasting application is essentially attempting to match known points, such as corners of the basketball court, with points in the human-operated camera video. Extracting a sufficient number of point correspondences permits the automatic broadcasting application to obtain a good estimate of the unknown camera parameters. To do so, the automatic broadcasting application may locate key points in the input video frame by searching for matching key points from a set of manually calibrated keyframes. In one embodiment, to perform such a matching, the automatic broadcasting application employs two homographies:

$$m_{i,k} = H H_k^{-1} M_i, \quad (12)$$

where $M_i$ is the 3D position of the key point, $H_k$ is the homography mapping $M_i$ to a manually calibrated keyframe k, $m_{i,k}$ is the corresponding key point in the input video frame, and H is the homography between keyframe k and the input video frame. The automatic broadcasting application may use scale-invariant feature transform (SIFT) matching between the keyframe and input video frame to estimate H. To filter out noisy correspondences, the automatic broadcasting application may synthesize an overhead view image (of, e.g., the basketball court) by combining multiple calibrated frames. Here, a noisy correspondence refers to a correspondence having an inconsistent mapping. For example, it may be assumed that points on the basketball court are being detected, and such points remain stationary. If a point on a player is instead detected, then the player's movements may make the correspondence inaccurate. Some frames may also be manually calibrated using, e.g., pointless calibration to obtain accurate camera parameters, and the frames may be selected to cover roughly the desired camera field of view (e.g., the entire basketball court) so that the automatic broadcasting application can find sufficient matches of input video frames to at least one of the calibrated frames (e.g., to a particular calibrated frame that shows one side of the basketball court). Finally, the automatic broadcasting application may warp the overhead image to the vantage point of each keyframe using the homography matrix $H_k$. As the warped overhead image tends to not have clutter (e.g., players), matches to an input video frame may be relatively accurate. The automatic broadcasting application may then greedily select the keyframe with the minimum sum of squared differences (SSD) between the warped overhead image and the input image. For a long video sequence, the automatic broadcasting application may also linearly interpolate $[\theta, \phi, f]^T$ frames where calibration fails (typically because of motion blur when the camera is moving quickly). In an alternative embodiment, an "instrumented" tripod may be used, and the instrumented tripod may provide actual pan/tilt values collected by electronic sensors embedded in the tripod itself.

At step 340, the automatic broadcasting application learns a regressor $h(\cdot)$ for predicting pan-tilt-zoom settings for new situations $\{x_t\}$ to record using a camera. A variety of learning techniques may be applied, such as linear least squares regression, support vector regressor (SVR), and random forest regression (RF). Experience has shown that, a least squares regression tends to perform well, in terms of root mean square (RMS) error, for low-dimensional feature vectors (e.g., the centroid feature) when learning the regressor. For high-dimensional features (e.g., heat maps and spherical map), SVR and RF tend to achieve lower RMS error. In both cases, RF tends to achieve similar or better performance relative to SVR. In terms of the cumulative fraction of test data where prediction error is less than a specified threshold, experience has shown that RF using spherical maps tends to achieve effective results, but RF using heat maps and SVR using spherical maps produce results of nearly the same quality.

Each of the linear least square regression, SVR, and RF may sometimes lead to large discrepancies (e.g., >10° pan angle difference) between the predicted pan-tilt-zoom states $\{\hat{y}_t\}$ and the camera pan-tilt-zoom states $\{y_t\}$ of the video captured by the human operator. Several factors may lead to inaccurate predictions, including errors in detecting and tracking players. In addition, considering the human operator's actions as an optimal camera behavior results in two implicit assumptions: (1) there is a single optimal pan angle $y_t^*$ for a particular situation $x_t$, and (2) the human operator never makes a mistake, i.e., $y_t = y_t^*$. However, neither of these assumptions is always true.

As to the assumption that there is a single optimal pan angle in particular, video frames with similar features $x_a \approx x_b$ may represent, e.g., players running in different directions, which require different pan angles $y_a \neq y_b$. As a result, $h(x_t)$ may not strictly be a single valued function and some formations of players may have multiple possible correct pan angles, i.e., $h(x_t) \rightarrow \{y_t, y_t', y_t'', \ldots\}$. Of course, a variety of other events captured by an autonomous video recorder may have similar occurrences. To remedy the problem of multiple possible pan angles, the automatic broadcasting application may use a feature vector which describes features at two or more points in time (e.g., now and one second ago), such as the heat map and spherical map generated from player trajectories, discussed above. Doing so allows the automatic broadcasting application to differentiate between situations where players are moving in one direction from when the players are moving in another direction.

Various training algorithms may be evaluated to determine which algorithm is best using re-cinematography, in which the automatic broadcasting application generates new video by resampling previously recorded video. For example, the automatic broadcasting application may set the pan angle to the predicted value $\hat{y}_t$ when resampling the previously recorded video. Since the prediction $\hat{y}_t$ is generally different from the ground truth $y_t$, the resampled video will have missing pixels where a resampled frame goes beyond the bounds of the original video. In one embodiment, the automatic broadcasting application determines the magnitude of such missing pixels in order to gauge how well the trained regressor mimicks the human operator. Given this information, the automatic broadcasting application may select which training algorithm to actually use as the one that generates a trained repressor which most closely models the human operator.

At step 350, the automatic broadcasting application generates planned pan-tilt-zoom setting for a new video using the learned regressor h(·). That is, given a video feed (e.g., from a camera with a wide field of view) capturing an event after the regressor is trained, the automatic broadcasting application extracts, for each frame of the video, a feature vector $x_t$ using the same feature extraction algorithm employed during training (e.g., the centroid, heat map, or spherical map). The automatic broadcasting application then inputs these features into the learned regressor h(·), which outputs planned pan-tilt-zoom setting $\hat{y}_t$ for the new video corresponding to the regressor's prediction of the pan-tilt-zoom configuration that would be chosen by a human camera operator given the feature vector $x_t$.

At step 360, the automatic broadcasting application optionally smoothes the pant-tilt-zoom settings generated at step 350. Smooth motion can be important to achieve aesthetic camera work. In one embodiment, the automatic broadcasting application may use a first-order Savitzky-Golay filter of, e.g., 33 frames (0.5 s) to smooth predicted pan angles. Experience has shown such smoothing can reduce the prediction error (i.e., the error between the regressor's output and the human-operated training data).

At step 370, the automatic broadcasting application controls an autonomous robotic camera to achieve the smoothed planned pan-tilt-zoom settings obtained at steps 360-370. Doing so may include, e.g., executing a separate algorithm which determines signals that need to be sent to the autonomous robotic camera to control servo motors to achieve the desired pan-tilt-zoom settings. Such an algorithm may be, e.g., a target following algorithm that tracks the planned pan-tilt-zoom settings. Alternatively, a stationary camera may simply capture a wide field of view (e.g., an entire basketball court), and the automatic broadcasting application may sample this captured video to generate a video that appears as if it were captured by a camera with the smoothed planned pan-tilt-zoom settings.

Figure 4:
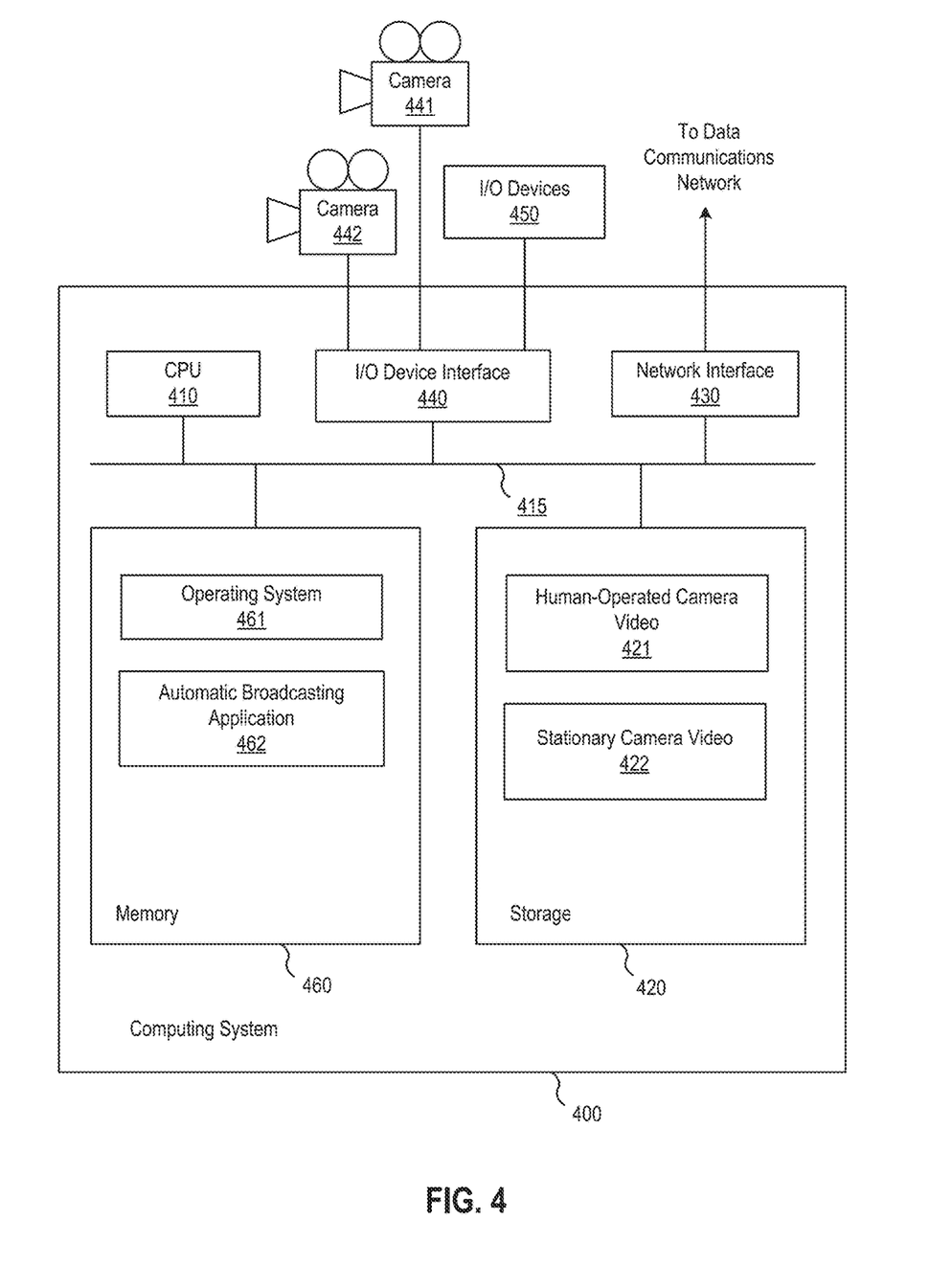
FIG. 4 illustrates a system in which an embodiment may be implemented.

FIG. 4 depicts a block diagram of a system 400 in which an embodiment may be implemented. As shown, the system 400 includes, without limitation, a central processing unit (CPU) 410, a network interface 430, an interconnect 415, a memory 460 and storage 420. The system 400 may also include an I/O device interface 440 connecting I/O devices 450 (e.g., keyboard, display and mouse devices) to the system 400. Illustratively, two cameras 441-442 are connected to the system 400 via the I/O device interface 440. In one embodiment, the camera 441 may be operated by a human to capture a video 421 of an environment. The camera 442 may be a stationary camera with a wide field of view that captures a second video 422 of the environment. In turn, feature vectors and pan-tilt-zoom states may be determined from the stationary camera video 422 and the human-operated camera video 421, respectively, and thereafter used to train a regressor to predict camera setting the human operator would choose. Such predictions output by the trained regressor may further be employed to control the camera 441 or a similar camera to automatically capture video, or alternatively to sample video captured with the stationary camera 442, according to the predictions.

The CPU 410 retrieves and executes programming instructions stored in the memory 460. Similarly, the CPU 410 stores and retrieves application data residing in the memory 460. The interconnect 415 facilitates transmission, such as of programming instructions and application data, between the CPU 410, I/O device interface 440, storage 420, network interface 430, and memory 460. CPU 410 is included to be representative of a single CPU, multiple CPUs, a single CPU having multiple processing cores, and the like. And the memory 460 is generally included to be representative of a random access memory. The storage 420 may be a disk drive storage device. Although shown as a single unit, the storage 420 may be a combination of fixed or removable storage devices, such as fixed disc drives, floppy disc drives, tape drives, removable memory cards or optical storage, network attached storage (NAS), or a storage area-network (SAN). Further, system 400 is included to be representative of a physical computing system as well as virtual machine instances hosted on a set of underlying physical computing systems. Further still, although shown as a single computing system, one of ordinary skill in the art will recognized that the components of the system 400 shown in FIG. 4 may be distributed across multiple computing systems connected by a data communications network.

As shown, the memory 460 includes an operating system 461 and an automatic broadcasting application 462. Illustratively, the operating system may include Microsoft's Windows®. The automatic broadcasting application 462 learns and applies a regressor which takes as input a feature vector and outputs pan-tilt-zoom settings predictive of what a human operator would do. In one embodiment, the automatic broadcasting application 462 may be configured to receive video input from the stationary camera 442 with a wide field of view and from the human-operated camera 441, extract feature vectors describing at least locations of objects in the video 422 input from the stationary camera 442, determine camera pan-tilt-zoom states of the human-operated camera video 421, learn a regressor for predicting pan-tilt-zoom settings for new situations that may be captured on video, generate planned pan-tilt-zoom setting using the learned regressor, smooth the generated pant-tilt-zoom settings, and cause an autonomous robotic camera (which may be the camera 441 or a similar camera) to achieve the smoothed planned pan-tilt-zoom settings, according to the method 300 discussed above with respect to FIG. 3.

Advantageously, techniques disclosed herein provide a data-driven approach for predicting the pan-tilt-zoom settings of a camera. The camera planning is posed as a supervised regression problem, which allows the learned regressor to anticipate action as a human operator would. As a result, techniques disclosed herein permit realtime prediction and camera control for autonomously recording videos which closely resemble the work of a human operator in similar situations.

The preceding description references aspects of the disclosure. However, it should be understood that the disclosure is not limited to specific described aspects. Instead, any combination of the preceding features and elements, whether related to different aspects or not, is contemplated to implement and practice the disclosure. Furthermore, although aspects of the disclosure may achieve advantages over other possible solutions or over the prior art, whether or not a particular advantage is achieved by a given aspect is not limiting of the disclosure. Thus, the preceding aspects, features, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various aspects of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams or flowchart illustrations, and combinations of blocks in the block diagrams or flowchart illustrations can be implemented by special-purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method for building a model to control a first device, comprising:
   receiving, as input:
      demonstration data corresponding to human operation of a second device used to perform a demonstration, wherein the second device is a camera and wherein the demonstration data includes a first video captured by the camera under control of the human operator; and
      environmental sensory data associated with the demonstration data;
   determining device settings of the second device from the demonstration data, wherein the device settings are pan-tilt-zoom settings of the camera associated with the first video and wherein determining the settings includes:
      estimating a calibration matrix of each frame of the first video using a pinhole model; and
      applying optimization to estimate parameters of a modified pinhole model and to estimate per-frame pan-tilt-zoom settings;
   extracting, from the environmental sensory data, feature vectors describing at least locations of objects in the environment;
   training, based on the determined device settings and the extracted feature vectors, a regressor which takes additional feature vectors as inputs, and outputs planned device settings for operating the first device; and
   instructing the first device to attain the planned device settings output by the trained regressor.

2. The method of claim 1, further comprising:
   receiving additional environmental sensory data;
   extracting, from the additional environmental sensory data, one or more additional feature vectors describing at least locations of objects; and
   inputting the one or more additional feature vectors to the trained regressor, wherein determining, by the trained regressor, the one or more planned device settings for operating the first device is based on the one or more additional feature vectors.

3. The method of claim 1, wherein the first device is an autonomous camera, and wherein attaining the planned device settings includes capturing video by controlling the autonomous camera to achieve planned pan-tilt-zoom settings output by the trained regressor.

4. The method of claim 1, wherein the first device includes one or more stationary cameras, and wherein attaining the planned device settings includes capturing videos with the one or more stationary cameras and sampling the videos captured with the one or more stationary cameras based on the planned device settings output by the trained regressor.

5. The method of claim 1, further comprising, smoothing the planned device settings output by the trained regressor prior to instructing the first device.

6. The method of claim 1, wherein the feature vectors include one or more spherical maps, the spherical maps being generated by projecting object locations onto a unit sphere.

7. The method of claim 1, wherein the environmental sensory data includes a second video of the environment captured by a stationary camera and having a wider field of view than the first video.

8. The method of claim 1, wherein determining the settings further includes:
   applying Levenberg-Marquardt optimization to estimate time invariant parameters of a modified pinhole model with a restricted distance between rotation and projection centers and to estimate per-frame pan-tilt-zoom settings by minimizing projection error of predefined key points.

9. The method of claim 1, wherein the first device and the second device are the same device.

10. A non-transitory computer-readable storage medium storing a program, which, when executed by a processor performs operations for building a model to control a first device, the operations comprising:
  receiving, as input:
    demonstration data corresponding to human operation of a second device used to perform a demonstration, wherein the second device is a camera and wherein the demonstration data includes a first video captured by the camera under control of the human operator; and
    environmental sensory data associated with the demonstration data;
  determining device settings of the second device from the demonstration data, wherein the device settings are pan-tilt-zoom settings of the camera associated with the first video and wherein determining the settings includes:
    estimating a calibration matrix of each frame of the first video using a pinhole model; and
    applying optimization to estimate parameters of a modified pinhole model and to estimate per-frame pan-tilt-zoom settings;
  extracting, from the environmental sensory data, feature vectors describing at least locations of objects in the environment;
  training, based on the determined device settings and the extracted feature vectors, a regressor which takes additional feature vectors as inputs, and outputs planned device settings for operating the first device; and
  instructing the first device to attain the planned device settings output by the trained regressor.

11. The computer-readable storage medium of claim 10, the operations further comprising:
  receiving additional environmental sensory data;
  extracting, from the additional environmental sensory data, one or more additional feature vectors describing at least locations of objects; and
  inputting the one or more additional feature vectors to the trained regressor, wherein determining, by the trained regressor, the one or more planned device settings for operating the first device is based on the one or more additional feature vectors.

12. The computer-readable storage medium of claim 10, wherein the first device is an autonomous camera, and wherein attaining the planned device settings includes capturing video by controlling the autonomous camera to achieve planned pan-tilt-zoom settings output by the trained regressor.

13. The computer-readable storage medium of claim 10, wherein the first device includes one or more stationary cameras, and wherein attaining the planned device settings includes capturing videos with the one or more stationary cameras and sampling the videos captured with the one or more stationary cameras based on the planned device settings output by the trained regressor.

14. The computer-readable storage medium of claim 10, the operations further comprising, smoothing the planned device settings output by the trained regressor prior to instructing the first device.

15. The computer-readable storage medium of claim 10, wherein the feature vectors include one or more spherical maps, the spherical maps being generated by projecting object locations onto a unit sphere.

16. The computer-readable storage medium of claim 10, wherein the environmental sensory data includes a second video of the environment captured by a stationary camera and having a wider field of view than the first video.

17. The computer-readable storage medium of claim 10, wherein the first device and the second device are the same device.

18. A system, comprising:
  a first data capture device;
  a second data capture device;
  a processor; and
  a memory, wherein the memory includes an application program configured to perform operations for building a model to control the first data capture device, the operations comprising:
    receiving, as input:
      demonstration data corresponding to human operation of the second data capture device used to perform a demonstration, wherein the second device is a camera and wherein the demonstration data includes a first video captured by the camera under control of the human operator; and
      environmental sensory data associated with the demonstration data;
    determining device settings of the second data capture device from the demonstration data, wherein the device settings are pan-tilt-zoom settings of the camera associated with the first video and wherein determining the settings includes:
      estimating a calibration matrix of each frame of the first video using a pinhole model; and
      applying optimization to estimate parameters of a modified pinhole model and to estimate per-frame pan-tilt-zoom settings;
    extracting, from the environmental sensory data, feature vectors describing at least locations of objects in the environment;
    training, based on the determined device settings and the extracted feature vectors, a regressor which takes additional feature vectors as inputs, and outputs planned device settings for operating the first device; and
    instructing the first data capture device to attain the planned device settings output by the trained regressor.

* * * * *

UNITED STATES PATENT AND TRADEMARK OFFICE
CERTIFICATE OF CORRECTION

PATENT NO. : 10,003,722 B2 Page 1 of 1
APPLICATION NO. : 14/660629
DATED : June 19, 2018
INVENTOR(S) : George Peter Carr et al.

It is certified that error appears in the above-identified patent and that said Letters Patent is hereby corrected as shown below:

In Column 4, Line 18, delete "$T_t$" and insert -- $\mathcal{T}_t$ --, therefor.

In Column 4, Line 21, delete "$T_t$" and insert -- $\mathcal{T}_t$ --, therefor.

In Column 5, Line 53, delete "P=KR[1|-C]," and insert -- P=KR[I|-C], --, therefor.

In Column 6, Lines 57-62, after " $\tilde{C}_x = \lambda_1 + \lambda_4 f$   $\tilde{C}_y = \lambda_2 + \lambda_5 f$   $\tilde{C}_z = \lambda_3 + \lambda_6 f$ " insert -- . --.

In Column 6, Line 64, delete "$\lambda_6]^T$" and insert -- $\lambda_6]^T$ --, therefor.

In Column 8, Line 27, delete "$\{y\}$" and insert -- $\{y_t\}$ --, therefor.

Signed and Sealed this
Sixth Day of November, 2018

Andrei Iancu
*Director of the United States Patent and Trademark Office*